(12) United States Patent
You

(10) Patent No.: US 11,155,289 B2
(45) Date of Patent: Oct. 26, 2021

(54) FOLDING CART

(71) Applicant: NINGBO MEIQI TOOL CO., LTD., Zhejiang (CN)

(72) Inventor: Lizhong You, Zhejiang (CN)

(73) Assignee: NINGBO MEIQI TOOL CO., LTD., Zhejiang (CN)

( * ) Notice: Subject to any disclaimer, the term of this patent is extended or adjusted under 35 U.S.C. 154(b) by 113 days.

(21) Appl. No.: 16/817,658

(22) Filed: Mar. 13, 2020

(65) Prior Publication Data
US 2021/0146981 A1 May 20, 2021

(30) Foreign Application Priority Data

Nov. 15, 2019 (CN) .......................... 201921985861.4

(51) Int. Cl.
*B62B 3/02* (2006.01)
(52) U.S. Cl.
CPC .......... *B62B 3/022* (2013.01); *B62B 2205/02* (2013.01); *B62B 2205/20* (2013.01); *B62B 2205/26* (2013.01)
(58) Field of Classification Search
CPC ......... B62B 3/022; B62B 3/025; B62B 3/027; B62B 3/02; B62B 2205/02; B62B 2205/20; B62B 2205/26; A47B 43/00; A47B 31/04
See application file for complete search history.

(56) References Cited

U.S. PATENT DOCUMENTS

| 5,806,864 A * | 9/1998 | Zielinski .................. B62B 3/02 |
| | | 280/42 |
| 8,256,629 B2 * | 9/2012 | Zhu ........................ A47B 43/00 |
| | | 211/149 |
| 9,913,533 B1 * | 3/2018 | Ke ....................... A47B 96/021 |
| 10,604,170 B1 * | 3/2020 | Davis ....................... B62B 3/02 |
| 2002/0109441 A1 * | 8/2002 | Wang ..................... A47B 43/00 |
| | | 312/258 |
| 2011/0253660 A1 * | 10/2011 | Pong ..................... A47B 31/04 |
| | | 211/198 |

FOREIGN PATENT DOCUMENTS

CN 103271554 2/2019

* cited by examiner

*Primary Examiner* — John D Walters
(74) *Attorney, Agent, or Firm* — JCIP Global Inc.

(57) ABSTRACT

The present invention discloses a folding cart, which comprises a left frame, a right frame, plurality of platforms, a left connecting rod, a right connecting rod, a guide rod, a sliding sleeve, a pressing member, a moving block and an elastic member. The sliding sleeve, disposed on the guide rod and slidable up and down relative to the guide rod, has a limiting hole opposite to the second opening of the guide rod. The pressing member has a first slope. The moving block has a second slope and a limiting protrusion. By the slope sliding between the pressing member and the moving block and the sliding of the sliding sleeve along the guide rod, the sliding is smooth, with low friction. Therefore, not too much force is required and the operation is thus easier.

10 Claims, 16 Drawing Sheets

FOLDING CART

CROSS-REFERENCE TO RELATED APPLICATION

This application claims the priority benefit of China application serial no. 201921985861.4, filed on Nov. 15, 2019. The entirety of the above-mentioned patent application is hereby incorporated by reference herein and made a part of this specification.

BACKGROUND

Technical Field

The present invention relates to the technical field of carts and in particular to a folding cart.

Description of Related Art

Folding carts are high in mobility and are space-saving when being folded.

For example, Chinese Patent CN103271554B disclosed a folding cart, comprising a table-board supporting device and at least two folding table-boards. Each folding table-board comprises at least two supporting plate units which are connected in a pivoted manner. The supporting plate units are movably connected to the table-board supporting device. The folding cart further comprises a locking mechanism. The locking mechanism comprises at least two pivoted rods and at least one folding-resistant component. The two pivoted rods are connected with each other and with the supporting plate units both in a pivoted manner. The folding-resistant component is connected with the two pivoted rods in a pivoted manner. The folding-resistant component comprises a left segment, a limiting segment and a right segment, which are defined according to the position of the folding-resistant component when it is unfolded. The limiting segment is connected to the left segment and the right segment in a pivoted manner. The other ends of the left segment and the right segment are connected to upper segments and lower segments of the two pivoted rods in a pivoted manner, respectively through a first rotating shaft. When the folding table-boards are unfolded, the folding-resistant components are abutted against the pivoted rods to prevent the folding table-boards from being folded. In this patent, when it is needed to fold the folding cart, the limiting segment is pulled so that the left segment and the right segment are folded relative to the limiting segment. Meanwhile, the pivoted rods are folded, the supporting plate units are folded, and then the folding cart is folded. It is convenient to store the folding cart when it is in the folded state. It will take much force for an operator to pull the limiting segment so that the pivoted rods on two sides approach each other. The operation is less convenient. Therefore, further improvement to the structure of folding carts is needed.

SUMMARY

A technical problem to be solved in the present invention is to provide a folding cart which is easier and more convenient to operate.

To solve the technical problem, the folding cart, comprises: a left frame, a right frame, a plurality of platforms disposed between the left frame and the right frame, each of which comprising a pair of boards rotatable relative to each other, a left connecting rod with a first end and a second end, a right connecting rod with a first end and a second end, wherein, an outer edge of each board is rotatably connected to a corresponding frame, the first end of the left connecting rod is rotatable relative to the left frame, and the first end of the right connecting rod is rotatable relative to the right frame, the folding cart further comprises:

a guide rod, which is hollow and arranged vertically, with a first opening disposed on the top of the guide rod and a second opening disposed on a sidewall of the guide rod;

a sliding sleeve, disposed on the guide rod and slidable up and down relative to the guide rod, having a limiting hole opposite to the second opening of the guide rod, both a second end of the left connecting rod and a second end of the right connecting rod being rotatably connected to the sliding sleeve;

a pressing member which passes through the first opening of the guide rod, having a first slope formed on the bottom of the pressing member;

a moving block movably disposed inside the guide rod, having a second slope resisting against the first slope of the pressing member formed on the top of the moving block, and having a limiting protrusion which is capable of protruding out from the second opening of the guide rod and extending into the limiting hole of the sliding sleeve, and capable of moving back away from the limiting hole due to the force of the pressed pressing member on the moving block; and an elastic member, resisting the moving block to keep the limiting portion of the moving block to move into the limiting hole of the sliding sleeve.

There may be several ways to set the direction of the first slope of the pressing member and the second slope of the moving block. Preferably, the first slope of the pressing member is extending down gradually from back to front, the second slope of the moving block is extending up gradually from front to back, the second opening is formed on a front sidewall of the guide rod, due to an external force, the pressing member be capable of downwardly pushing the moving block, so that the limiting portion of the moving block moves backward to get out of the limiting hole of the sliding sleeve. When being stressed downward, the pressing member pushes the moving block to move backward, so that the limiting protrusion of the moving block moves backward to get out of the limiting hole of the sliding sleeve. The first slope of the pressing member and the second slope of the moving block may be arranged to enable the moving block to move forward, so that the limiting protrusion of the moving block moves forward to get out of the limiting hole of the sliding sleeve.

To support the moving block, a mounting base is fixedly embedded in the guide rod, the moving block is movably disposed inside the mounting base, a pair of first grooves, into which the bottom of the pressing member is extended, are disposed on the top of the mounting base, a pair of second grooves, from which the limiting portion of the moving block passes and which are opposite to the second opening of the guide rod, are disposed on a sidewall of the mounting base. By receiving the moving block in the mounting base, the moving block is less likely to fall off.

There may be several structures for the movable connection between the moving block and the mounting base. Preferably, a guide portion is formed on one of the moving block and the mounting base, and a chute in which the guide portion is received is formed on the other one, and the guide portion and the chute be capable of sliding relative to each other and both extend in the movement direction of the limiting portion of the moving block.

And/or, a first step portion, extending outward from the top of the first slope, is further formed on the bottom of the pressing member.

And/or, a second step portion, extending outward from the bottom of the first slope, is further formed on the bottom of the pressing member.

With the arrangement of the guide portion and the chute, the moving block can be moved to a desired position quickly; and/or, with the arrangement of the first step portion, when the pressing member moves downward, the first step portion can be resisted against the top of the moving block to limit the downward movement distance of the pressing member; and/or, with the arrangement of the second step portion, when the pressing member moves upward, the second step portion can be resisted against the inner wall of the second groove of the mounting base to limit the upward movement distance of the pressing member.

There may be several structures for the elastic member. Preferably, the elastic member is a spring having one end resisted against an inner wall of the mounting base and the other end resisted against the moving block.

There may be several structures for the pressing member. Preferably, the pressing member comprises an upper pressing block with a top portion, a bottom portion and a middle portion, and a lower pressing block with a top portion and a bottom portion, the top portion of the upper pressing block is extended out of the first opening of the guide rod and the bottom portion of the upper pressing block can be resisted against the top portion of the lower pressing block, two opposite pins are disposed on the bottom portion of the lower pressing block and the first slope is arranged on each pin, correspondingly, the pair of first grooves are arranged on the mounting base at corresponding positions, and the pair of second slopes are arranged on the moving block at corresponding positions; and, the pins of the lower pressing block can interact with the pair of the second slopes of the moving block after passing through the pair of first grooves of the mounting base. With the arrangement of the upper pressing block and the lower pressing block, lower assembly precision is required when compared to the one-piece structure of the pressing block. With the arrangement of two first slopes and two second slopes, the movement of the lower pressing block and the moving block becomes more stable when compared to the technical solution having only one first slope and one second slope.

There may be several structures for the rotary connection between the two boards on the same platform. Preferably, the two boards on the same platform be capable of rotating by a rotating shaft that is extended in the front-rear direction, and a front end of the rotating shaft is connected to the guide rod.

An uppermost rotating shaft is connected to the guide rod by a fixed sleeve sheathed on the guide rod, the top portion of the upper pressing block is extended out of the fixed sleeve, a resisting portion is arranged on the fixed sleeve circumferentially, which is capable of resisting against the sliding sleeve when the folding cart is in the unfolded state.

The resisting portion of the fixed sleeve plays a role of hinting the movement distance of the sliding sleeve. When the sliding sleeve moves upward to be resisted against the resisting portion of the fixed sleeve, the upper pressing block is released. Due to the spring, the limiting protrusion of the moving block is extended forward into the limiting hole of the sliding sleeve, so as to connect the moving block with the sliding sleeve.

There may be several ways for the connection between the rotating shaft and the guide rod. Preferably, a through hole, from which the front portion of the rotating shaft corresponding to an uppermost platform passes, is formed in the middle portion of the upper pressing block, and the front portion of the rotating shaft is connected to the guide rod after passing through the through hole. With the formation of the through hole, the upper pressing block can be pressed, at most, to the upper portion of the wall of the through hole to be resisted against the rotating shaft. The through hole plays a role of defining the downward movement distance of the upper pressing block.

To avoid the unfolding of the folded folding cart, a locking lever that connects the left frame with the right frame after the folding cart is folded is disposed on the folding cart, one end of the locking lever is connected to one of the frames in a rotary manner and the other end of the locking lever has a bayonet facing downward, the other frame has a clamping portion that is used for being clamped in the bayonet. After the folding cart is folded, the clamping portion is clamped in the bayonet of the locking lever, so as to connect the left frame with the right frame. In this way, it is impossible for the folding cart to unfold.

To stop the folding cart if necessary, a U-shaped connecting base having a down-facing opening is arranged on the bottom of each frame, two opposite first connecting arms are formed on the U-shaped connecting base, rollers are disposed between the two first connecting arms, the rollers are connected to the two first connecting arms by connecting shafts that run through the corresponding rollers, a second connecting arm is formed on an outer side of at least one roller, which be capable of tightly clamping the roller between the two first connecting arms, the middle portion of the second connecting arm is connected to the connecting shaft in a rotary manner, an operating end, by which a pressure is applied, is formed at each of two ends of the second connecting arm. When it is necessary to stop the folding cart, the operating end on the right side of the second connecting arm is stepped on, the two first connecting arms approach each other, so that the roller is clamped between the two first connecting arms and thus cannot rotate any more. In this way, the folding cart stops moving. When it is necessary to make the folding cart continuing to move, the operating end on the left side of the second connecting arm is stepped on, the second connecting arm rotates in a reverse direction, the two first connecting arms get away from each other, the roller is separated from the two first connecting arms, so that the roller be capable of rotating again. In this way, the folding cart can move again.

Compared with the prior art, the folding cart of the present invention has the following advantages: under the design of the guide rod, the sliding sleeve, the pressing member, the moving block and the elastic member, after the pressing member is pressed down by the user, the first slope of the pressing member acts on the second slope of the moving block, the limiting protrusion of the moving block is pushed to get out of the limiting hole of the sliding sleeve, so that the moving block is separated from the sliding sleeve; then, the guide rod is pulled upward by the user, the sliding sleeve moves downward relative to the guide rod, the left connecting rod and the right connecting rod get close to the guide rod, and the boards on each platform get close to each other. Compared with the existing technology in which the left segment and the right segment are rotatably folded relative to the limiting segment by pulling the limiting segment, greater friction is realized.

In the present invention, by the slope sliding between the pressing member and the moving block and the sliding of the sliding sleeve along the guide rod, the left connecting rod and the right connecting rod get close to each other. The sliding is smooth, with low friction. Therefore, not too much force is required and the operation is thus easier.

The folding cart of the present invention can be used as a dining car or commodity shelf.

DESCRIPTION OF THE EMBODIMENTS

Figure 1:
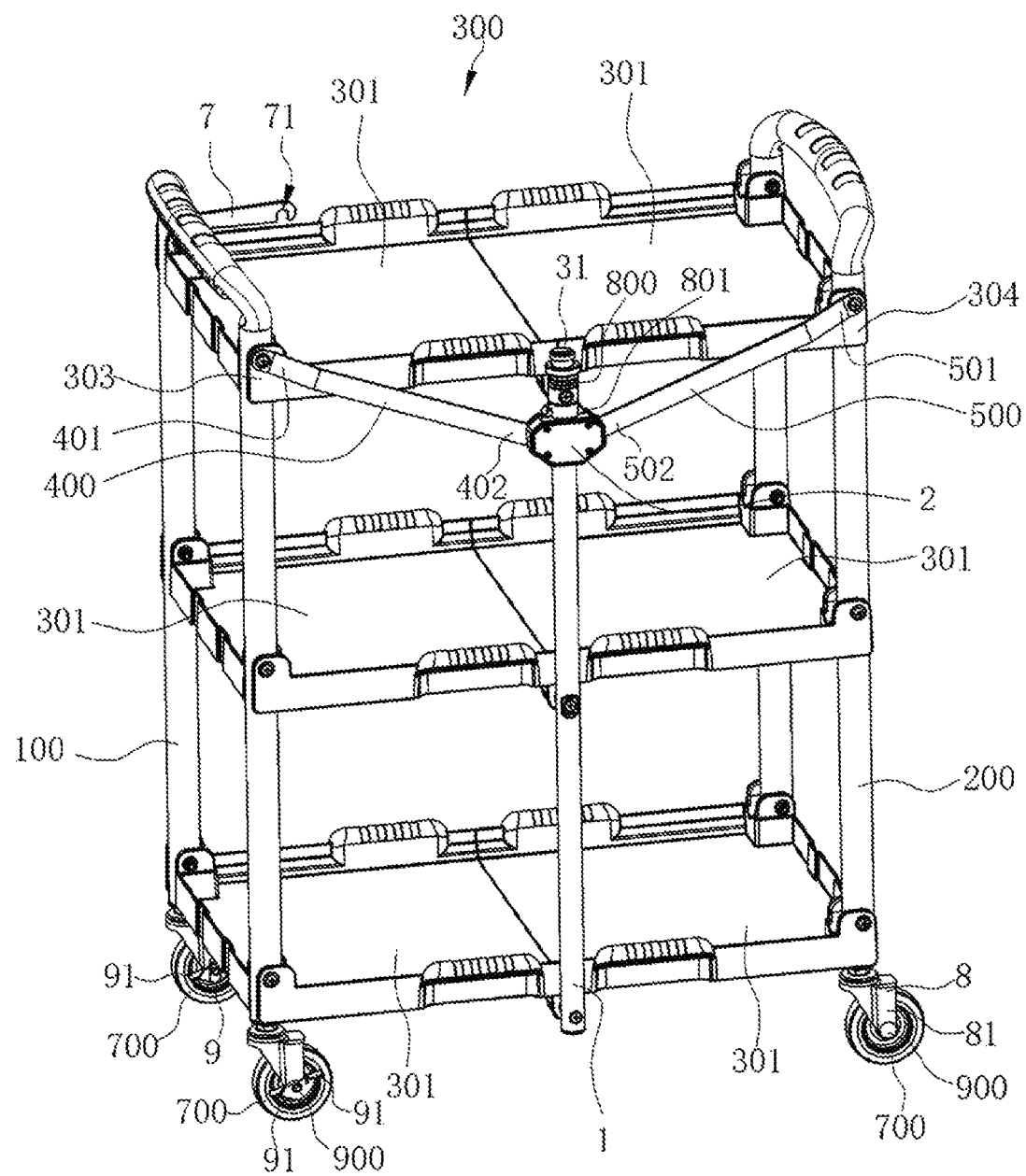
FIG. 1 is a perspective view of a folding cart according to an embodiment of the present invention, when the folding cart is in the unfolded state.

To enable a further understanding of the present invention content of the invention herein, refer to the detailed description of the invention and the accompanying drawings below:

FIGS. 1-19 show a preferred embodiment of the present invention. The folding cart comprises a left frame 100 (the direction of left, right is based on FIG. 1), a right frame 200, a plurality of platforms 300 disposed between the left frame 100 and the right frame 200, a left connecting rod 400, a right connecting rod 500, a hollow guide rod 1, and the locking lever 7 are connected to one of the frames in a rotary manner and the other end of the locking lever 7 has a bayonet 71 facing downward.

The guide rod 1 is vertically arranged on a front side of the plurality of platforms 300. The left connecting rod 400 and the right connecting rod 500 are arranged on two sides of the guide rod 1, one on each side. From the top down, a fixed sleeve 800 and a sliding sleeve 2 are sheathed on the guide rod 1. From the top down, a pressing member 3, a moving block 4 and a mounting base 6 are arranged in the guide rod 1. An elastic member is arranged between the moving block 4 and the mounting base 6.

The left frame 100 and the right frame 200 are arranged laterally symmetrically. Two U-shaped connecting bases 8 (see FIGS. 1-5), having a down-facing opening is arranged on the bottom of each frame. two opposite first connecting arms 81 are formed on the U-shaped connecting base 8, rollers 700 are disposed between the two first connecting arms 81, the rollers 700 are connected to the two first connecting arms 81 by connecting shafts 900 that run through the corresponding rollers 700, a second connecting arm 9 is formed on an outer side of at least one roller 700, which is capable of tightly clamping the roller 700 between the two first connecting arms 81, the middle portion of the second connecting arm 9 is connected to the connecting shaft 900 in a rotary manner, an operating end 91, by which a pressure is applied, is formed at each of two ends of the second connecting arm 9;

With reference to FIGS. 1-5, in this embodiment, there are total three platforms 300. Each platform 300 comprises a pair of boards 301 being capable of rotating relative to each other. In this embodiment, the two boards 301 on the same platform 300 are capable of being rotated by a rotating shaft 302 that is extended in the front-rear direction, and a front end of the rotating shaft 302 is connected to the guide rod 1. The rotation centerline for each pair of boards 301 is the respective rotating shaft 302. The guide rod 1 is perpendicular to the rotation centerline for each pair of boards 301. In this way, when the guide rod 1 moves upward relative to the left and right frames, the rotating shaft 302 move upward too. Meanwhile, each pair of boards 301 rotates slowly around the respective rotating shaft 302.

With reference to FIG. 3, FIG. 6 and FIGS. 14-15, an uppermost rotating shaft 302 is connected to the guide rod 1 by the fixed sleeve 800 sheathed on the guide rod 1, the top portion of the upper pressing block 31 is extended out of the fixed sleeve 800, a resisting portion 801 is arranged on the fixed sleeve 800 circumferentially, which can be resisted against the sliding sleeve 2 when the folding cart is in the unfolded state.

An outer edge of each of the two boards 301 is connected to a corresponding frame in a rotary manner. A first end 401 of the left connecting rod 400 is connected to an outer edge 303 of a left side of a corresponding board 301 and the left frame 100 in a rotary manner, respectively, by a pin shaft 403 (see FIG. 6). Similarly, a first end 501 of the right connecting rod 500 is connected to an outer edge 304 of a right side of the corresponding board 301 and the right frame 200 in a rotary manner, respectively, by a pin shaft. In this way, the boards 301 and the right connecting rod 500 can all rotate around a pin shaft, relative to the right frame 200. Of course, the rotary connection by using a pin shaft can be replaced with hinged connection.

Figure 6:
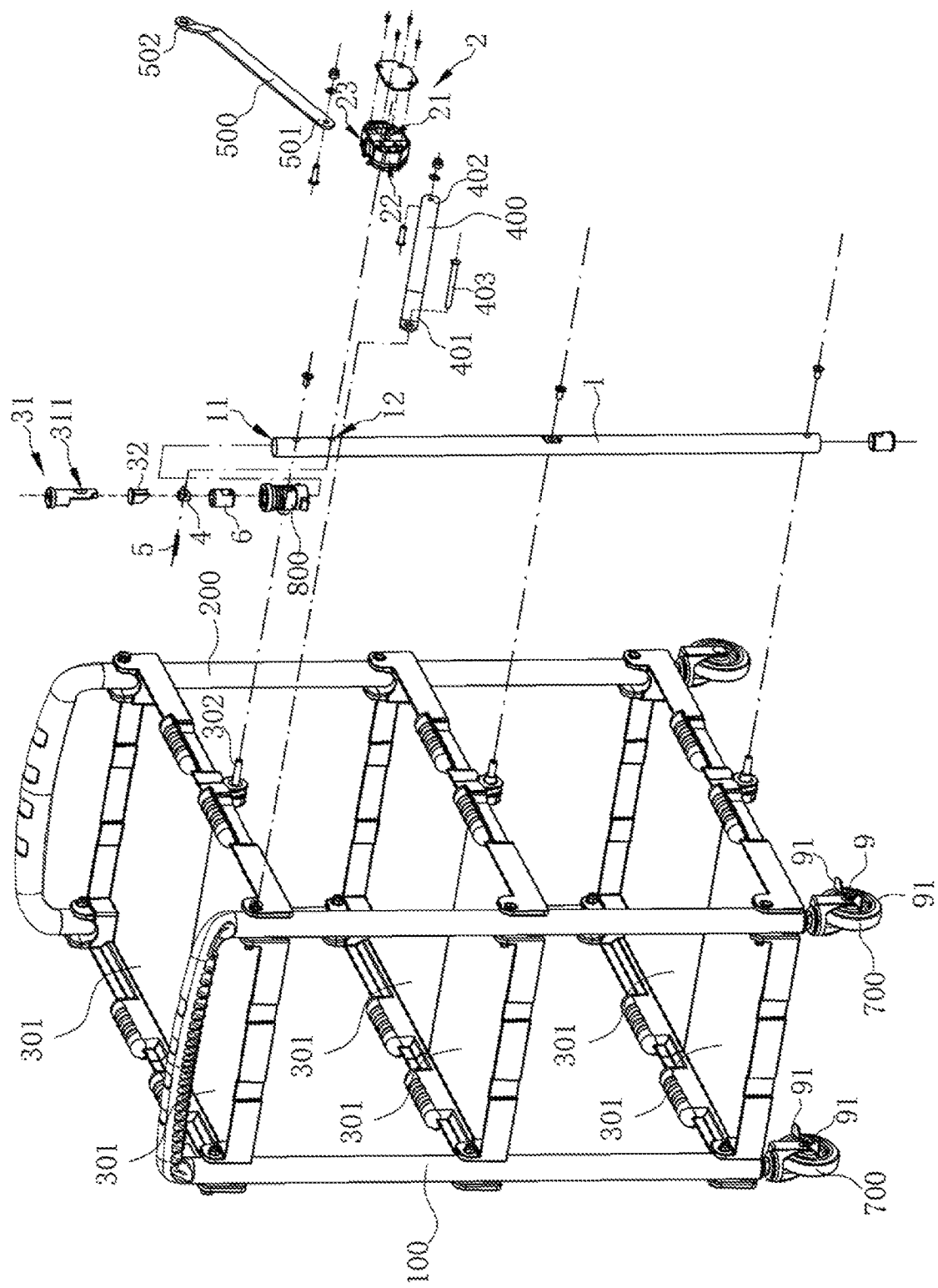
FIG. 6 is an exploded view of the folding cart according to the embodiment of the present invention.

With reference to FIG. 6, the guide rod 1 is hollow and arranged vertically, with a first opening 11 disposed on the top of the guide rod 1 and a second opening 12 disposed on a sidewall of the guide rod 1. Preferably, the second opening 12 is arranged at the front of the guide rod 1.

With reference to FIG. 6, the sliding sleeve 2 (see FIG. 13) is disposed on the guide rod 1 and capable of sliding up and down relative to the guide rod 1. There is a limiting hole 21 (see FIG. 6, FIG. 17 and FIG. 19) opposite to the second opening 12 of the guide rod 1. A left slot 22, into which the left connecting rod 400 is inserted, is formed on a left side of the sliding sleeve 2, and the left slot 22 is connected to a second end 402 of the left connecting rod 400 in a rotary manner. A right slot 23, into which the right connecting rod 500 is inserted, is formed on a right side of the sliding sleeve 2, and the right slot 23 is connected to a second end 502 of the right connecting rod 500 in a rotary manner. The rotary connection structure may be pivoted connection or may be replaced with hinged connection.

Figure 7:
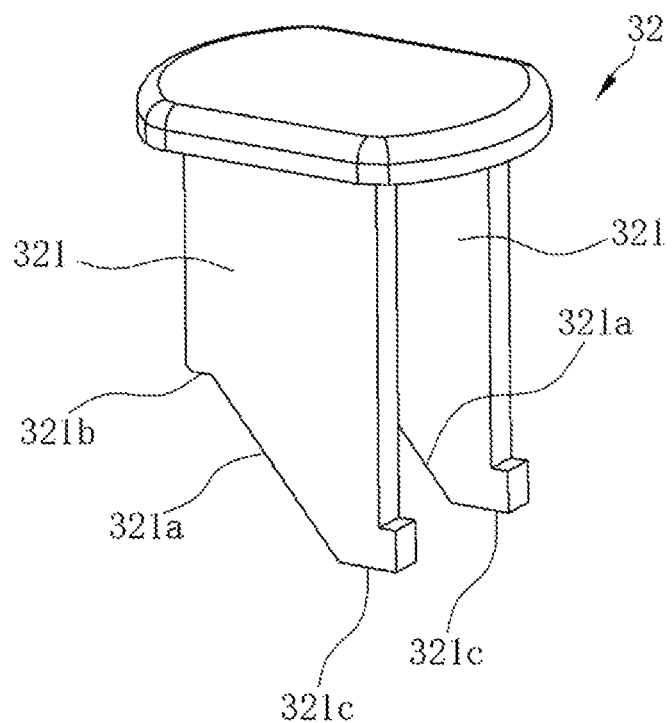
FIG. 7 is a perspective view of a lower pressing block according to the embodiment of the present invention.
Figure 8:
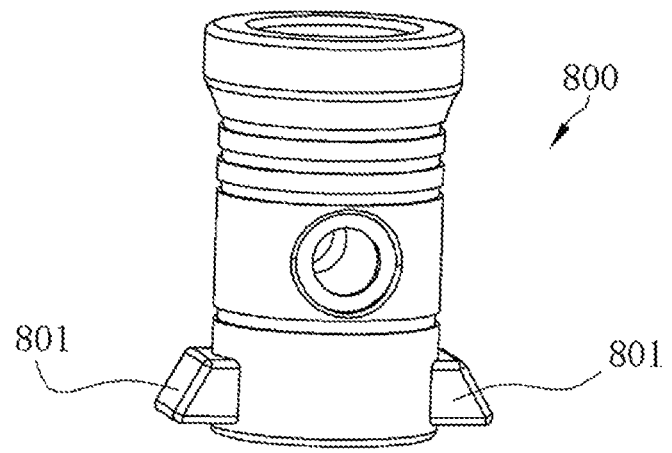
FIG. 8 is a perspective view of a fixed sleeve according to the embodiment of the present invention.
Figure 9:
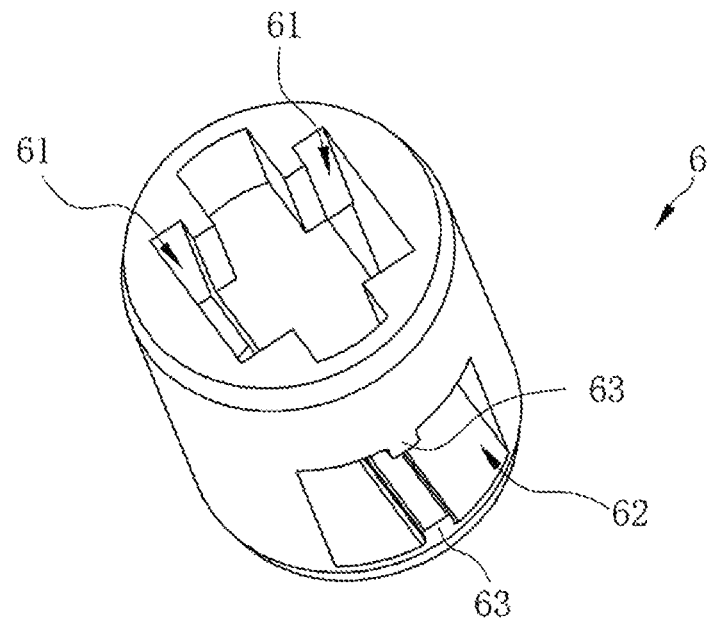
FIG. 9 is a perspective view of a mounting base according to the embodiment of the present invention.
Figure 10:
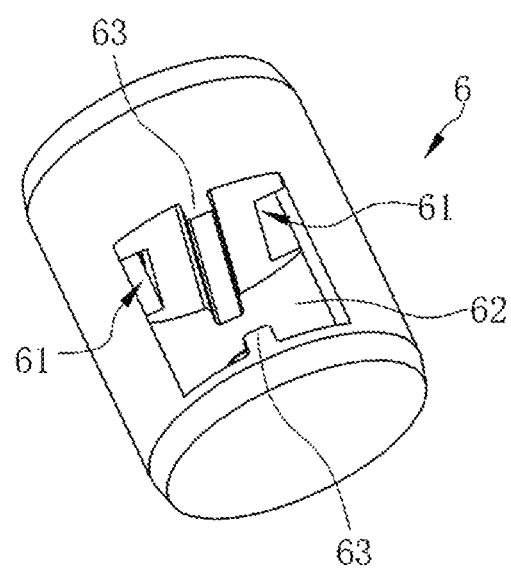
FIG. 10 is a perspective view of FIG. 9 from another angle.
Figure 11:
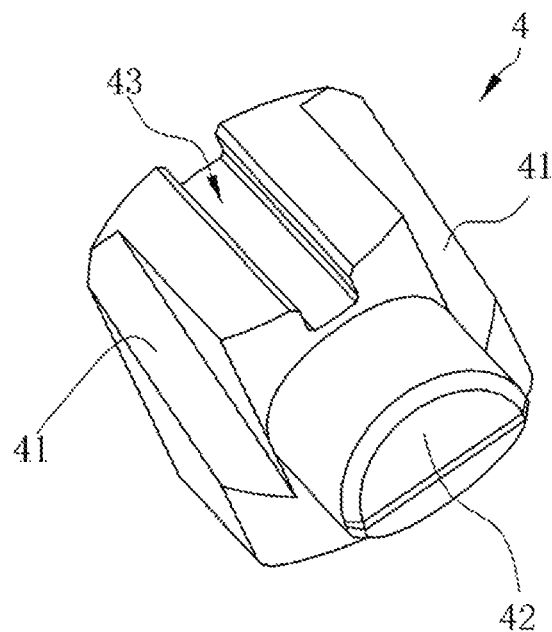
FIG. 11 is a perspective view of a moving block according to the embodiment of the present invention.
Figure 12:
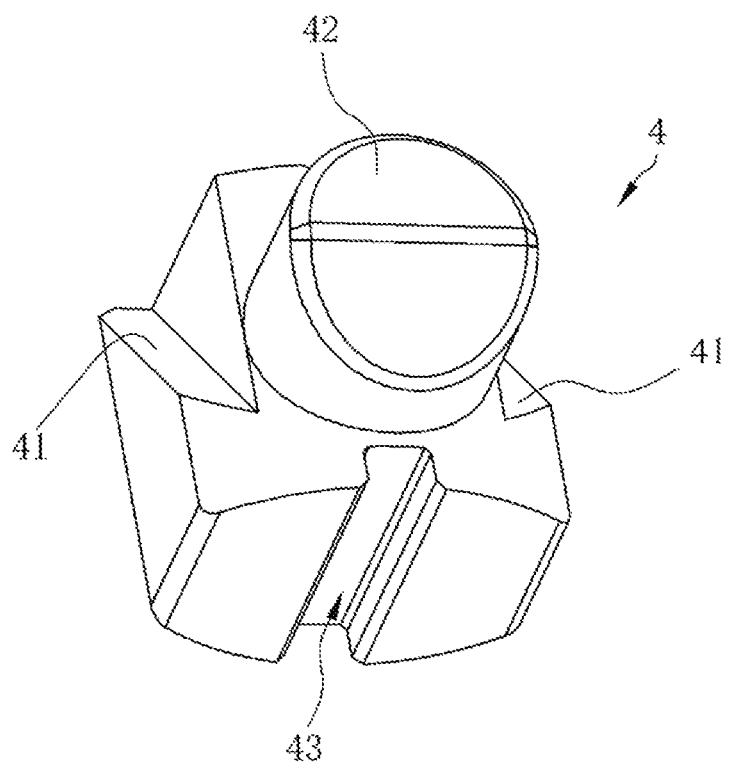
FIG. 12 is a perspective view of FIG. 11 from another angle.
Figure 13:
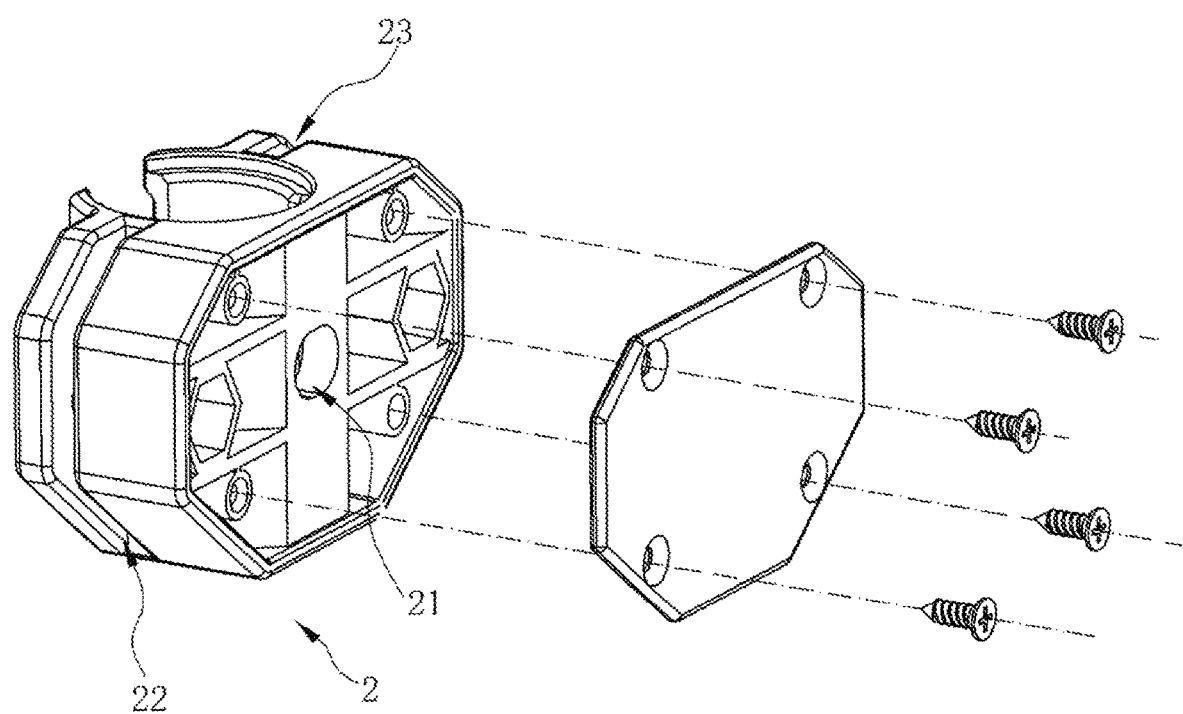
FIG. 13 is an exploded view of a sliding sleeve according to the embodiment of the present invention.
Figure 14:
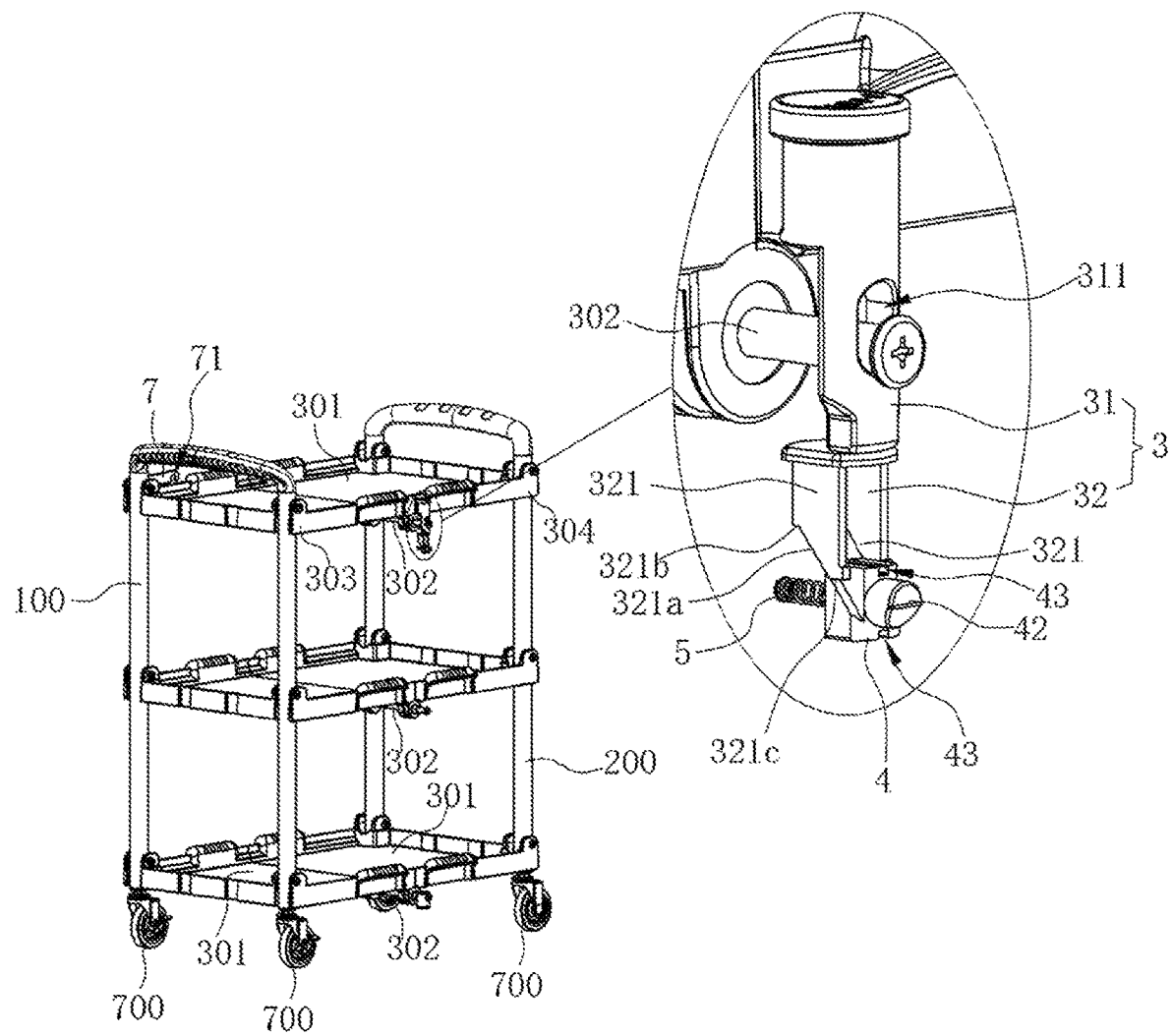
FIG. 14 is a perspective view with an enlarged view of FIG. 1, with the guide rod, the mounting base, the left connecting rod and the right connecting rod removed.
Figure 15:
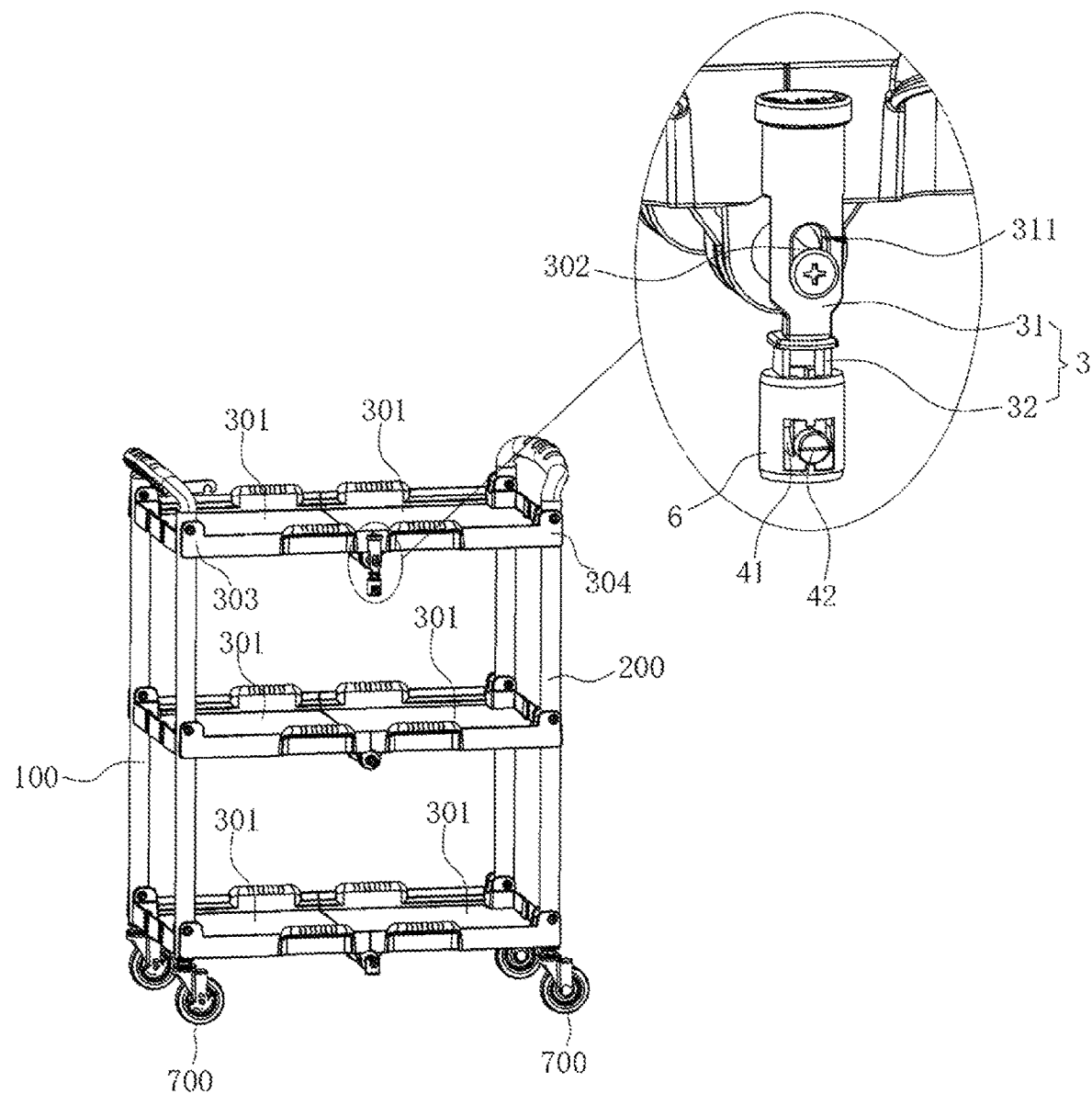
FIG. 15 is a perspective view of FIG. 1, with the guide rod, the left connecting rod and the right connecting rod removed.
Figure 16:
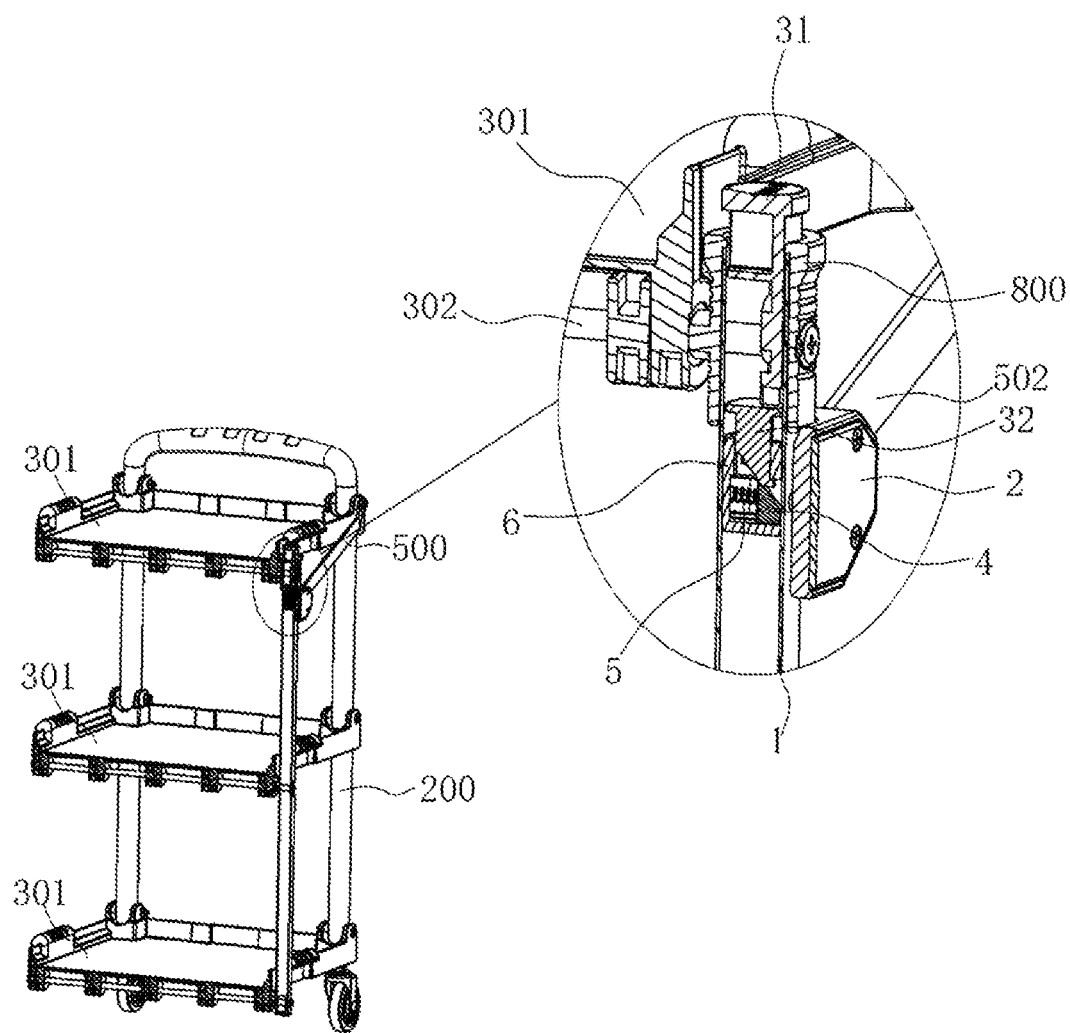
FIG. 16 is a longitudinal sectional view with an enlarged view of the folding cart according to the embodiment of the present invention, showing, the limiting protrusion of the moving block extended into the limiting hole of the sliding sleeve when the upper pressing block is not stressed.
Figure 17:
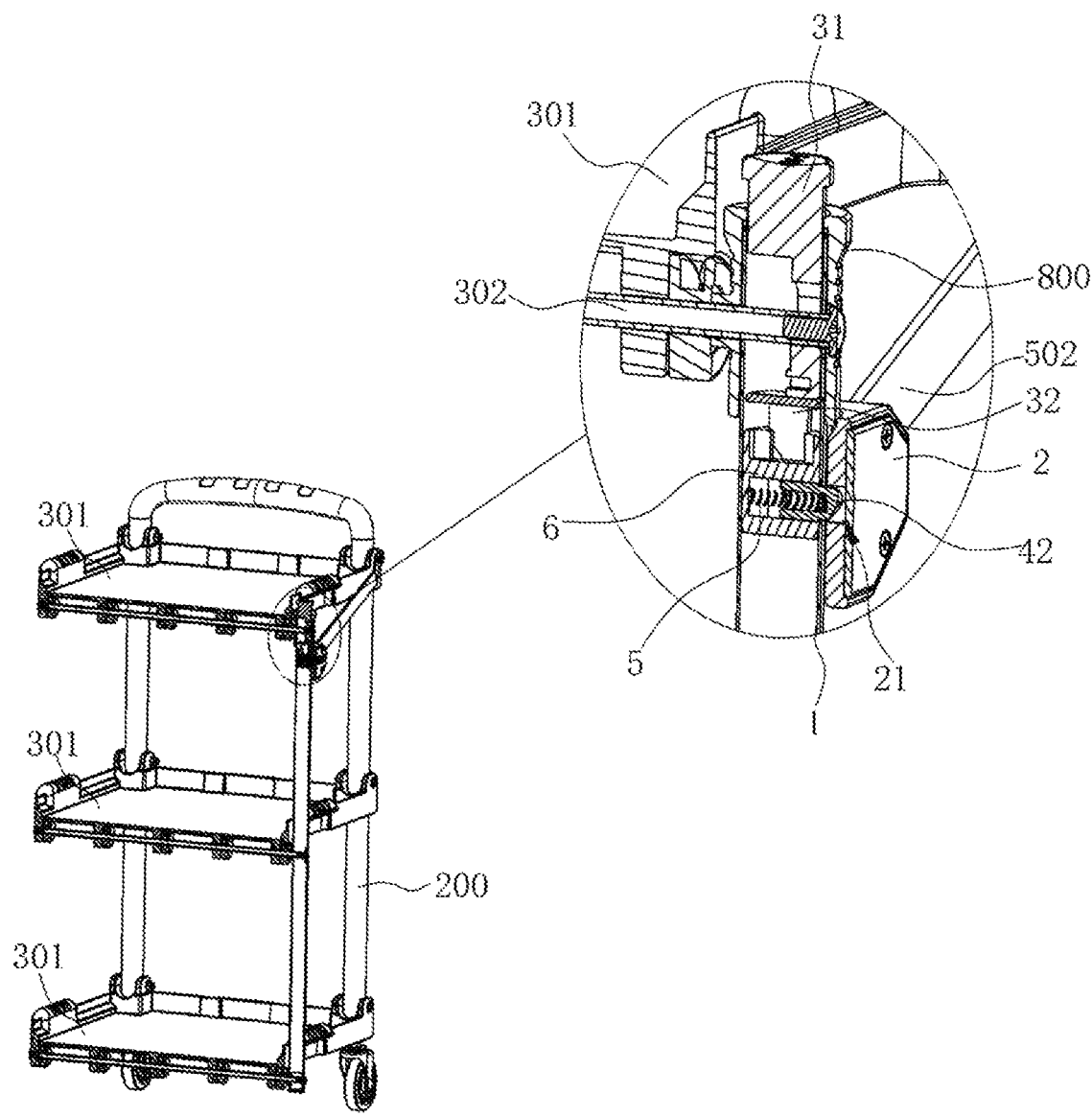
FIG. 17 is another longitudinal sectional view with an enlarged view of the folding cart according to the embodiment of the present invention, showing the limiting protrusion of the moving block extended into the limiting hole of the sliding sleeve.
Figure 18:
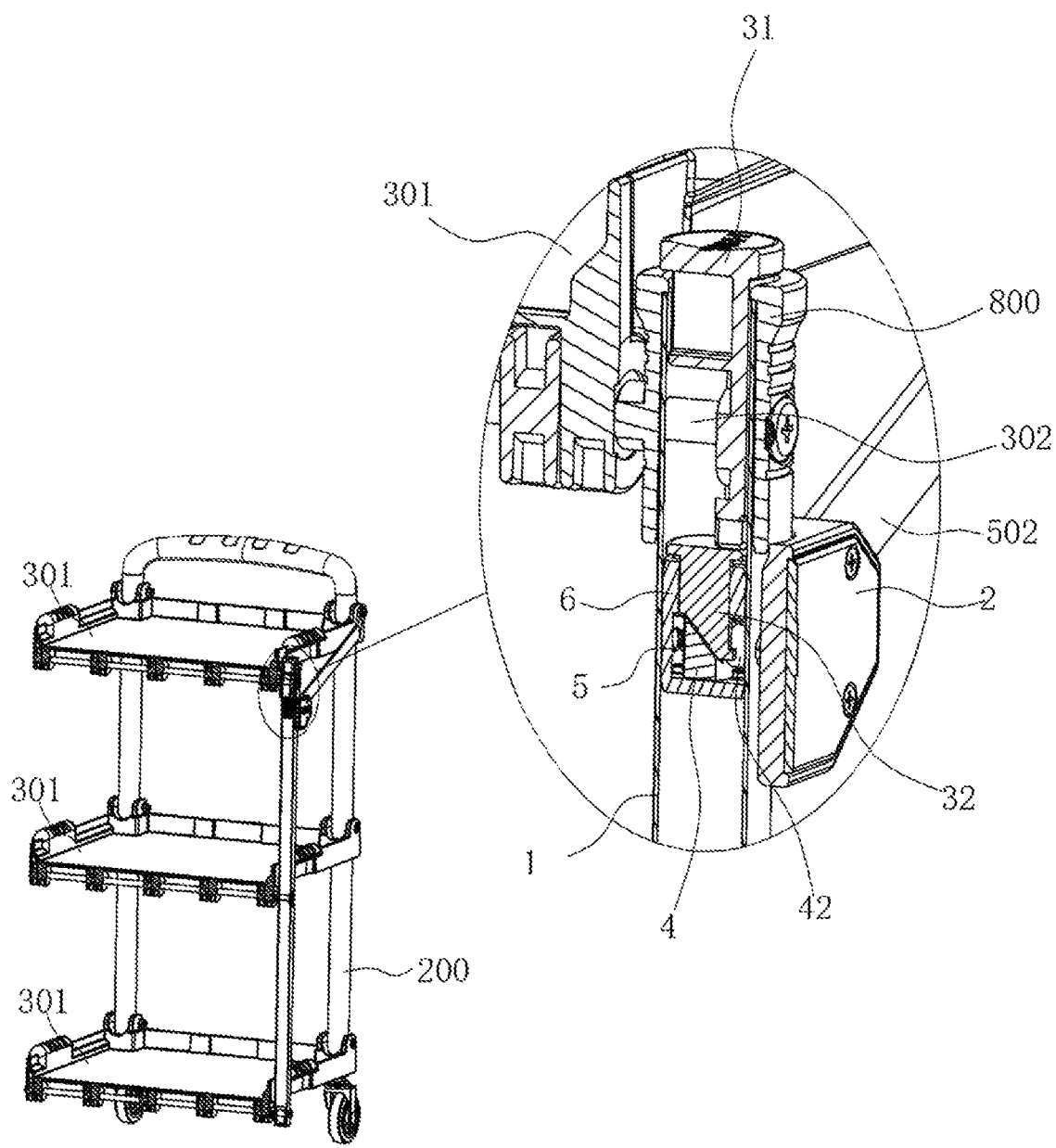
FIG. 18 is yet another longitudinal sectional view with an enlarged view of the folding cart according to the embodiment of the present invention, showing, the upper pressing block moves downward when being stressed, the moving block moves backward, and the limiting protrusion of the moving block moves backward to get out of the limiting hole of the sliding sleeve.
Figure 19:
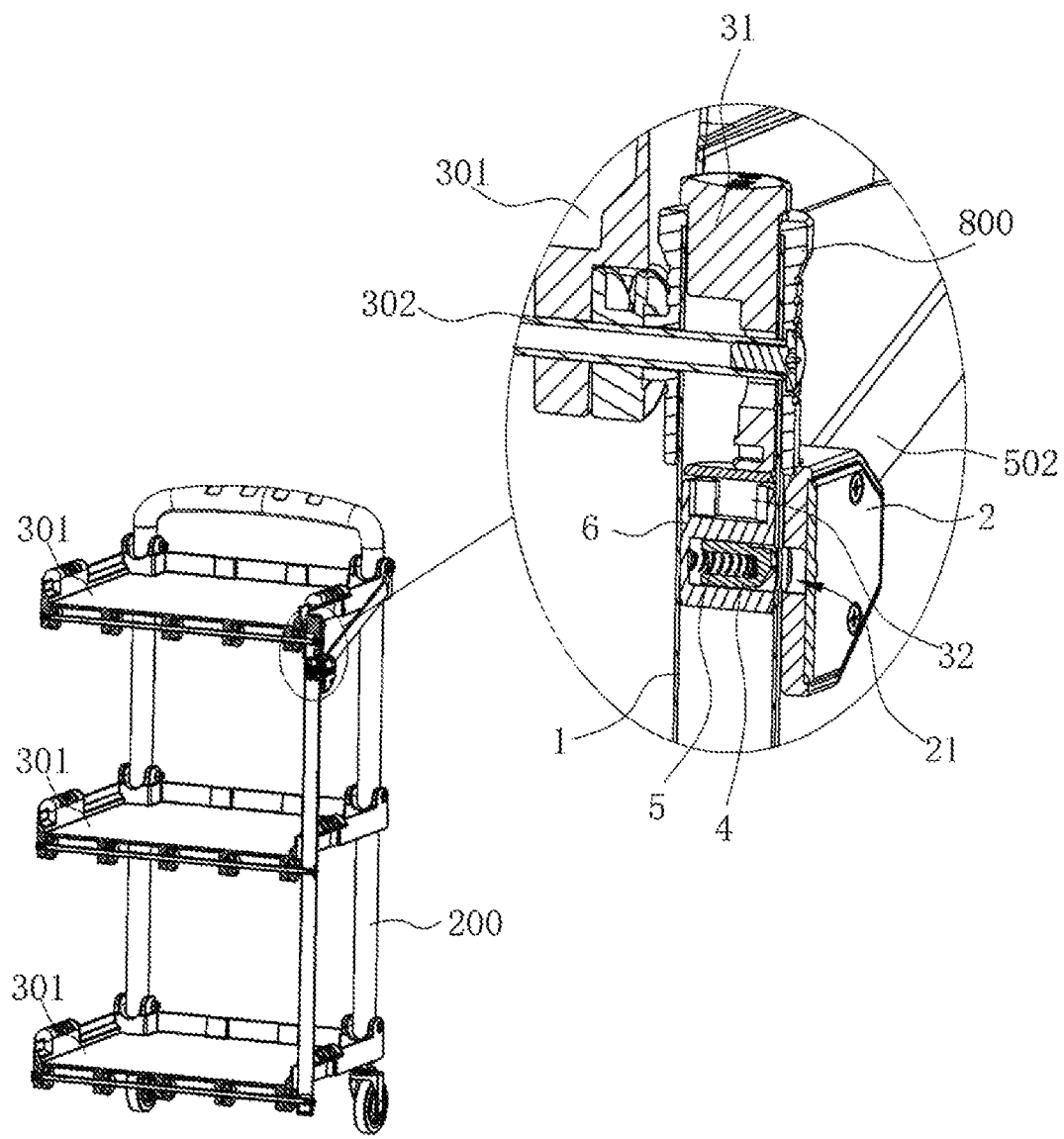
FIG. 19 is still another longitudinal sectional view with an enlarged view of the folding cart according to the embodiment of the present invention, showing, the limiting protrusion of the moving block moves backward to get out of the limiting hole of the sliding sleeve.

With reference to FIG. 6, FIG. 7 and FIGS. 14-19, the pressing member 3 passes through the first opening 11 of the guide rod 1, having a first slope 321a formed on the bottom of the pressing member 3. The first slope 321a is extending down gradually from back to front. A first step portion 321b extending outward from the top of the first slope 321a and a second step portion 321c extending outward from the bottom of the first slope 321a are further formed on the bottom of the pressing member 3. Specifically, the pressing member 3 comprises an upper pressing block 31 with a top portion, a bottom portion and a middle portion, and a lower pressing block 32 with a top portion and a bottom portion; a through hole 311, from which the front portion of the rotating shaft 302 corresponding to an uppermost platform 300 passes, is formed in the middle portion of the upper pressing block 31, and the front portion of the rotating shaft 302 is connected to the guide rod 1 after passing through the through hole 311. With reference to FIG. 7, the bottom portion of the upper pressing block 31 can be resisted against the top portion of the lower pressing block 32, two opposite pins 321 are disposed on the bottom portion of the lower pressing block 32, and the first slope 321a is arranged on each pin, correspondingly, the pair of first grooves 61 are arranged on the mounting base 6 at corresponding positions, and the pair of second slopes 41 are arranged on the moving block 4 at corresponding positions; and, the pins 321 of the lower pressing block 32 can interact with the pair of the second slopes 41 of the moving block 4 after passing through the pair of first grooves 61 of the mounting base 6.

With reference to FIGS. 11-19, the moving block 4 is movably arranged in the mounting base 6 in the guide rod 1. The second slope 41, which can be resisted against the first slope 321a of the pressing member 3 formed on the top of the moving block 4. The second slope 41 is extending up gradually from front to back. The moving block 4 has a limiting protrusion 42 which is capable of protruding out from the second opening 12 of the guide rod 1 and extending into the limiting hole 21 of the sliding sleeve 2, and capable of moving back away from the limiting hole 21 due to the force of the pressed pressing member 3 on the moving block 4. The moving block 4 has a chute 43 in which a guide portion 63 of the mounting base 6 is received.

With reference to FIG. 6 and FIGS. 14-19, an elastic member 5, resisting the moving block 4 to keep the limiting portion 42 of the moving block 4 to move into the limiting hole 21 of the sliding sleeve 2. Preferably, the elastic member 5 is a spring having one end resisted against an inner wall of the mounting base 6 and the other end resisted against the moving block 4.

With reference to FIG. 9, FIG. 10 and FIGS. 15-19, the mounting base 6 is fixedly embedded in the guide rod 1. a pair of first grooves 61, into which the bottom of the pressing member 3 is extended, are disposed on the top of the mounting base 6, a pair of second grooves 62, from which the limiting portion 42 of the moving block 4 passes and which are opposite to the second opening 12 of the guide rod 1, are disposed on a sidewall of the mounting base 6. Guide portions 63 are arranged above and below the second groove of the mounting base 6. The guide portions 63 are extended in the movement direction of the moving block 4. The guide portion 63 and the chute 43 can slide relative to each other and both extend in the movement direction of the limiting portion 42 of the moving block 4.

Figure 2:
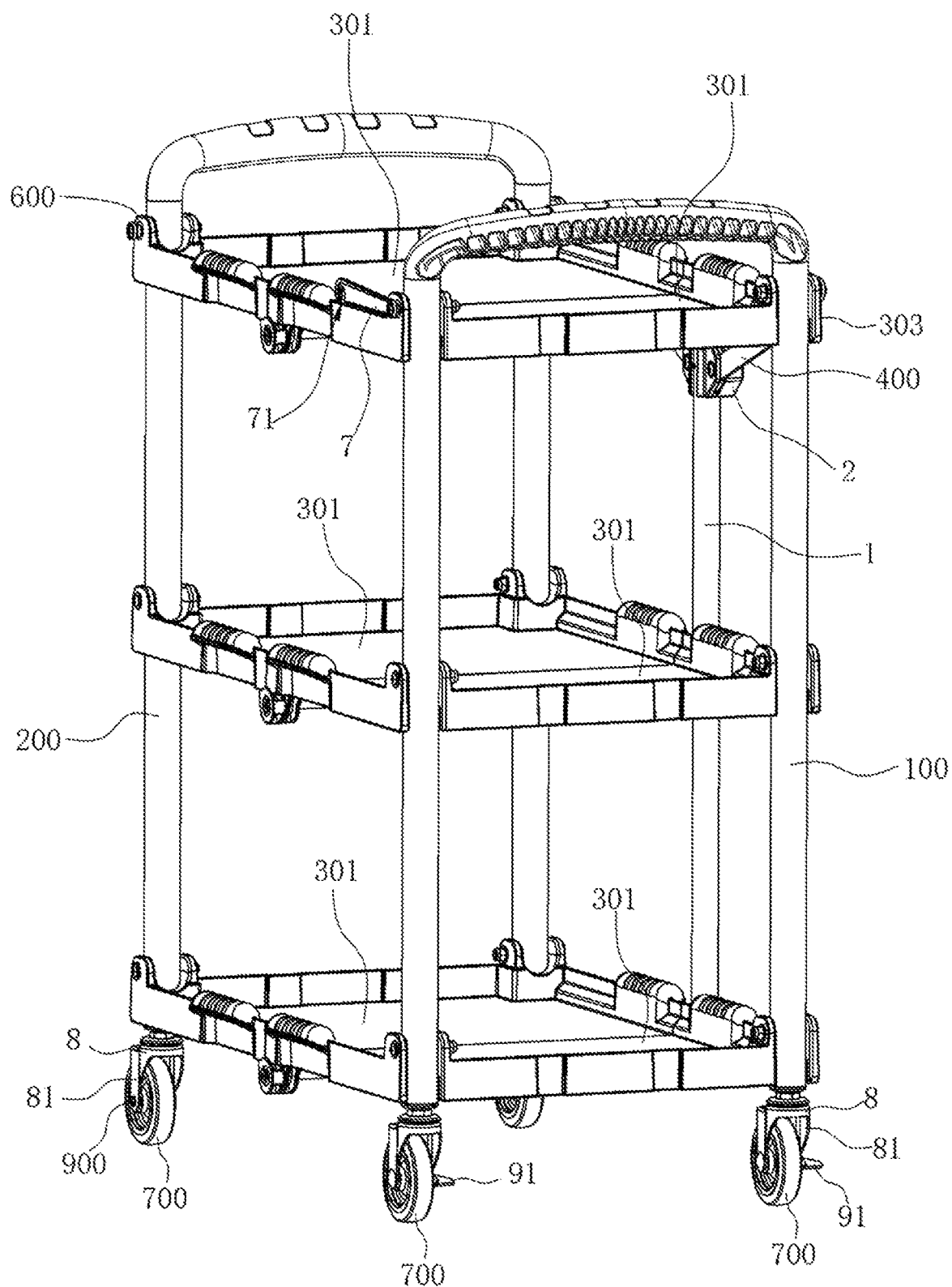
FIG. 2 is a perspective view of FIG. 1 from another angle, when the folding cart is in the unfolded state.

With reference to FIGS. 1 and 2, one end of the locking lever 7 is connected to the left frame 100 in a rotary manner, by pivoted connection. The pivoted connection may be replaced with hinged connection. The other end of the locking lever 7 has a bayonet 71 facing downward. The right frame 200 has a clamping portion 600 (see FIG. 2) that is used for being clamped in the bayonet 71.

The working principle and usage of the folding cart will be described below.

Figure 3:
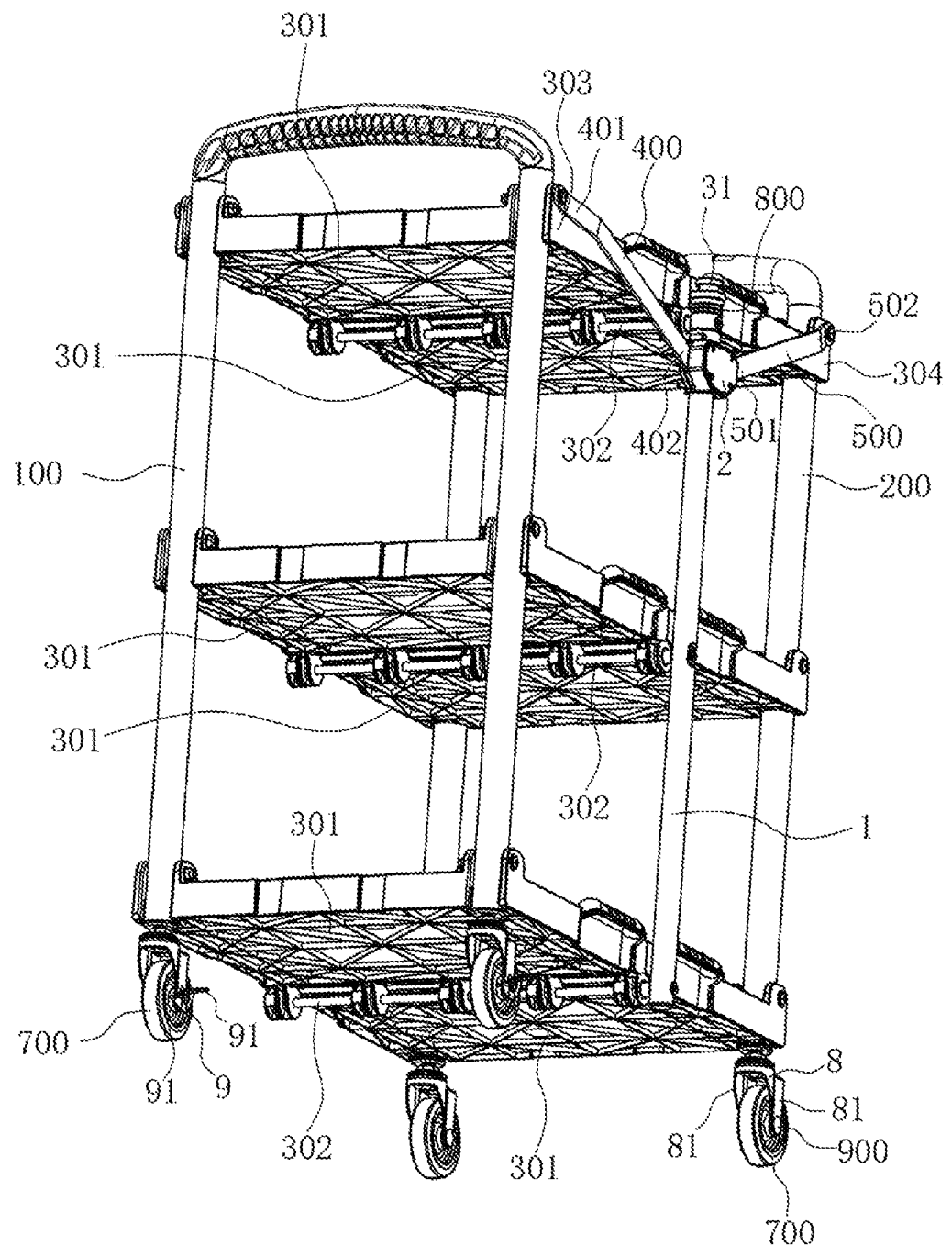
FIG. 3 is a perspective view of FIG. 1 from bottom view, when the folding cart is in the unfolded state.

When the folding cart is in the unfolded state, with reference to FIGS. 1-3, the bottom of the first slope 321a of the lower pressing block 32 is resisted against the top of the second slope 41 of the moving block 4, and by the spring, the limiting protrusion 42 of the moving block 4 is extended into the limiting hole 21 of the sliding sleeve 2. In this way, the moving block 4 is connected to the sliding sleeve 2. By the sliding sleeve 2, the left connecting rod 400 and the right connecting rod 500, the two boards 301 on each platform 300 are in the unfolded state.

Figure 4:
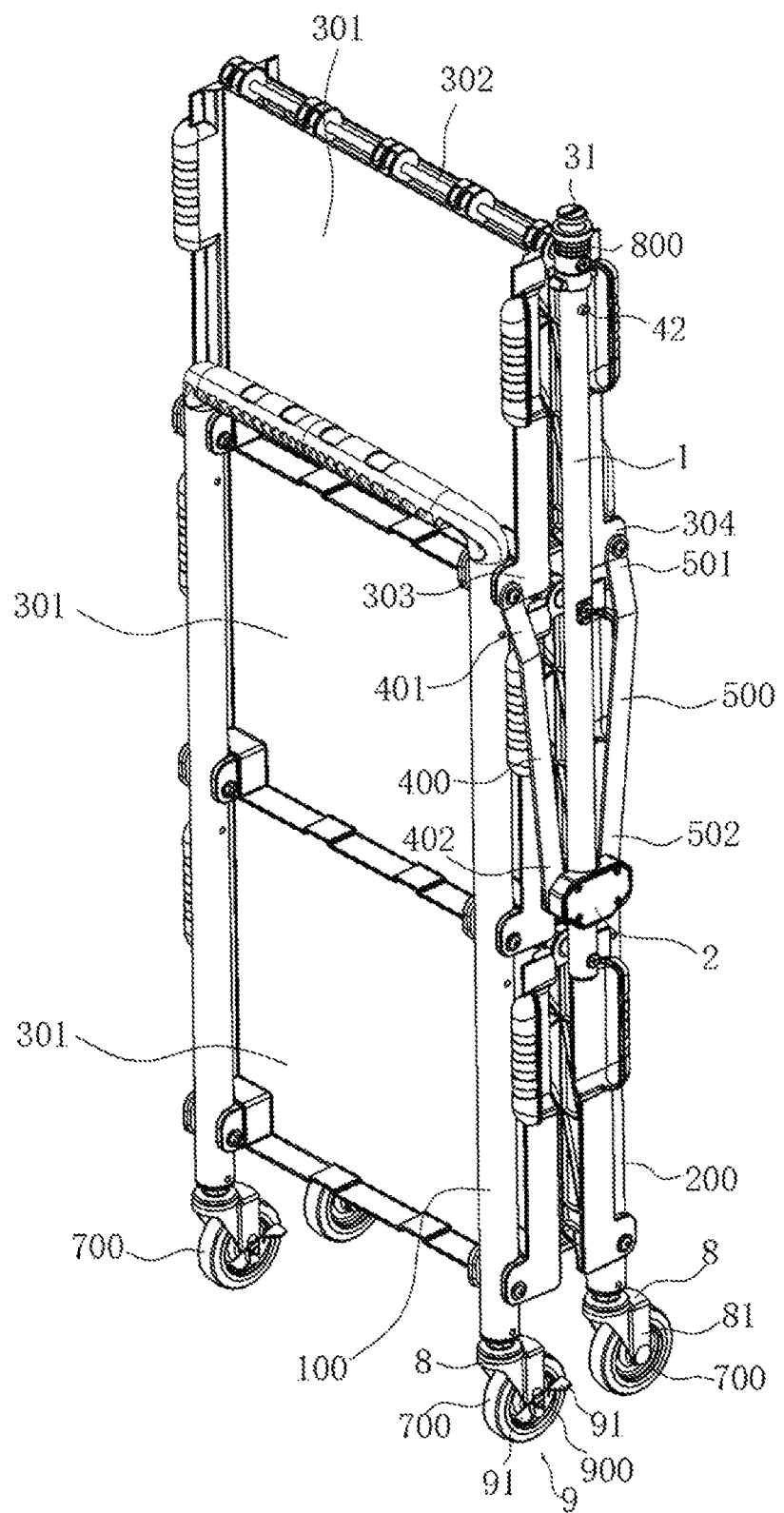
FIG. 4 is a perspective view of the folding cart according to the embodiment of the present invention, when the folding cart is in the folded state.
Figure 5:
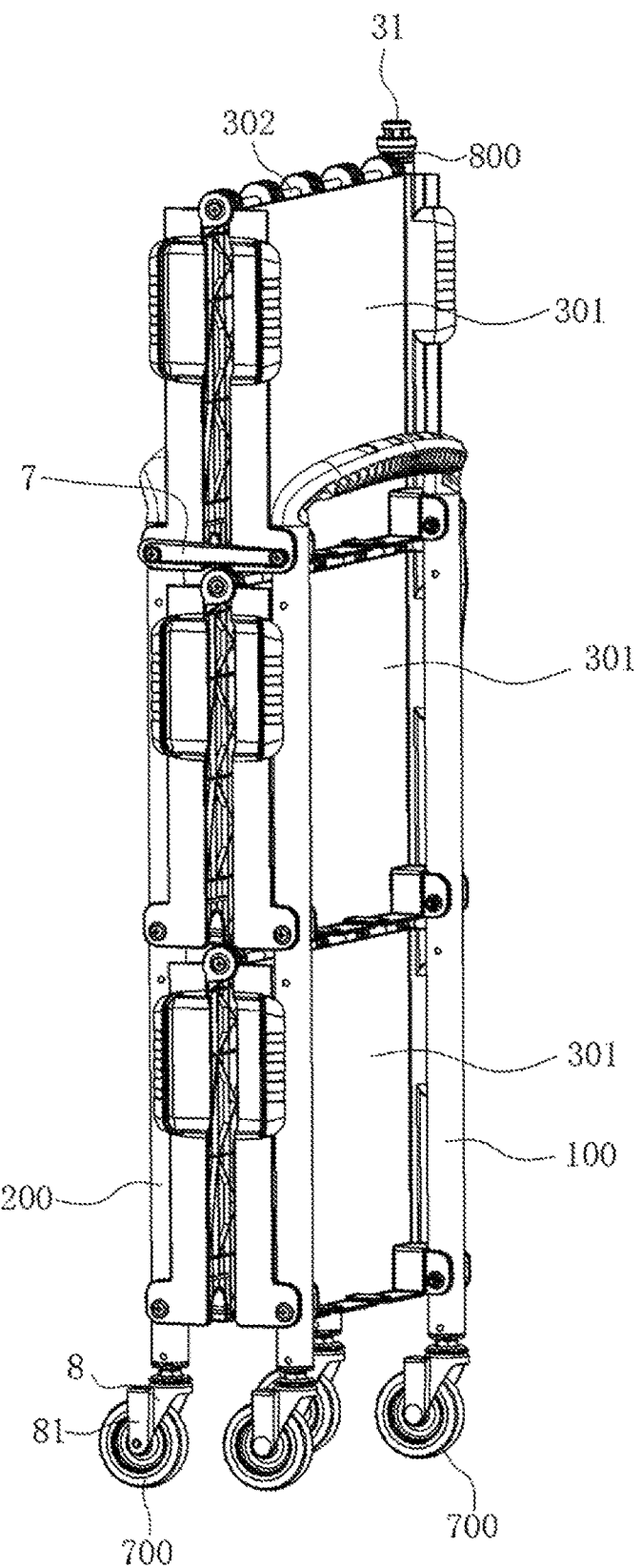
FIG. 5 is a perspective view of FIG. 4 from another angle, when the folding cart is in the folded state.

When it is necessary to fold the folding cart, the upper pressing block 31 is pressed down, the lower pressing block 32 moves downward; and, the first slope 321a of the lower pressing block 32 acts on the moving block 4 downward and pushes the moving block 4 to move backward. In this way, the limiting protrusion 42 of the moving block 4 gets out of the limiting hole 21 of the sliding sleeve 2. The moving block 4 is thus separated from the sliding sleeve 2. The upper pressing block 31 is released. Due to the spring, the moving block 4 moves forward, and also the upper pressing block 31 moves upward to recover to its initial state. Then, the fixed sleeve 800 is held and pulled upward by the user. In this way, the sliding sleeve 2 slides downward relative to the fixed sleeve 800. The sliding is smooth and the operation is easy. The left connecting rod 400 and the right connecting rod 500 move downward together with the sliding sleeve 2, to get close to the guide rod 1. Accordingly, the left frame 100 and the right frame 200 approach each other. Thus, the two boards 301 on each platform 300 approach each other. Then, the clamping portion 600 is clamped in the bayonet 71 of the locking lever 7, so as to connect the left frame 100 with the right frame 200. In this way, it is impossible for the folding cart to unfold. The folded state of the folding cart is shown in FIGS. 4-5.

When it is necessary to unfold the folded folding cart, the left frame 100 is separated from the right frame 200. By the left connecting rod 400 and the right connecting rod 500, the two boards 301 on each platform 300 are unfolded gradually. Now, the sliding sleeve 2 moves upward along the guide rod 1. Then, the upper pressing block 31 is pressed down. When the sliding sleeve 2 moves upward to be resisted against the resisting portion 801 of the fixed sleeve 800, the upper pressing block 31 is released. By the spring, the limiting protrusion 42 of the moving block 4 is extended forward into the limiting hole 21 of the sliding sleeve 2, so as to connect the moving block 4 with the sliding sleeve 2. The unfolded state of the folding cart is fixed. The two boards 301 on each platform 300 are completely unfolded. The unfolded state of the folding cart is shown in FIGS. 1-3.

When it is necessary to stop the folding cart, the operating end 9 (see FIG. 1) on the right side of the second connecting arm 9 is stepped on, the two first connecting arms 81 approach each other, so that the roller 700 is clamped between the two first connecting arms 81 and thus cannot rotate any more. In this way, the folding cart stops moving. When it is necessary to make the folding cart continuing to move, the operating end 91 (see FIG. 1) on the left side of the second connecting arm 9 is stepped on, the second connecting arm 9 rotates in a reverse direction, the two first connecting arms 81 get away from each other, the roller 700 is separated from the two first connecting arms 81, so that the roller 700 be capable of rotating again. In this way, the folding cart can move freely again.

What is claimed is:

1. A folding cart, comprising:
   a left frame;
   a right frame;
   a plurality of platforms disposed between the left frame and the right frame, wherein each of the plurality of platforms comprises a pair of boards rotatable relative to each other; and an outer edge of each board is rotatably connected to a corresponding frame;
   a left connecting rod with a first end and a second end;
   a right connecting rod with a first end and a second end, wherein the first end of the left connecting rod is rotatable relative to the left frame, and the first end of the right connecting rod is rotatable relative to the right frame;
   a guide rod, which is hollow and arranged vertically, with a first opening disposed on a top of the guide rod and a second opening disposed on a sidewall of the guide rod;
   a sliding sleeve, disposed on the guide rod and vertically slidable relative to the guide rod, having a limiting hole opposite to the second opening of the guide rod, both the second end of the left connecting rod and the second end of the right connecting rod being rotatably connected to the sliding sleeve;
   a pressing member which passes through the first opening of the guide rod, having a first slope formed on a bottom of the pressing member;
   a moving block movably disposed inside the guide rod, having a second slope formed on a top of the moving block and abutting against the first slope of the pressing member, and having a limiting protrusion, wherein the limiting protrusion is capable of protruding out from the second opening of the guide rod and extending into the limiting hole of the sliding sleeve, and the moving block is capable of moving the limiting protrusion back away from the limiting hole when a force is applied to the pressing member; and
   an elastic member, resisting the moving block to keep the limiting protrusion of the moving block to move into the limiting hole of the sliding sleeve.

2. The folding cart of claim 1, wherein the first slope of the pressing member is extending down gradually from back to front;
   the second slope of the moving block is extending up gradually from front to back;
   the second opening is formed on a front sidewall of the guide rod; and
   when an external force is applied, the pressing member is capable of downwardly pushing the moving block to backwardly move out the limiting protrusion of the moving block from the limiting hole of the sliding sleeve.

3. The folding cart of claim 1, wherein a mounting base is fixedly embedded in the guide rod;
   the moving block is movably disposed inside the mounting base;
   a pair of first grooves is disposed on a top of the mounting base, and the pair of the first grooves is configured for a lower part of the pressing member to extend into; and
   a pair of second grooves being opposite to the second opening of the guide rod is disposed on a sidewall of the mounting base, and the pair of the second grooves is configured for the limiting protrusion of the moving block to protrude out.

4. The folding cart of claim 3, wherein a guide portion is formed on one of the moving block and the mounting base, a chute in which the guide portion is received is formed on the other one of the moving block and the mounting base, and the guide portion and the chute are capable of sliding relative to each other and both extend in a movement direction of the limiting protrusion of the moving block;
   a first step portion extending outward from a top of the first slope is further formed on the bottom of the pressing member;
   a second step portion extending outward from a bottom of the first slope is further formed on the bottom of the pressing member.

5. The folding cart of claim 3, wherein the elastic member is a spring having one end resisted against an inner wall of the mounting base and the other end resisted against the moving block.

6. The folding cart of claim 3, wherein the pressing member comprises an upper pressing block and a lower pressing block, the upper pressing block has a top portion, bottom portion and a middle portion, the lower pressing block has a top portion and a bottom portion;
   the top portion of the upper pressing block is extended out of the first opening of the guide rod and the bottom portion of the upper pressing block is capable of abutting against the top portion of the lower pressing block;
   two pins are oppositely disposed on the bottom portion of the lower pressing block, and the first slope is arranged on each of the pins;
   the second slope arranged on the moving block is provided as a pair of second slopes; and
   the pins of the lower pressing block is capable of coupling with the pair of the second slopes of the moving block after passing through the pair of first grooves of the mounting base.

7. The folding cart of claim 6, wherein two boards on the same platform are capable of rotating by a rotating shaft that is extended in a front-rear direction, and a front end of the rotating shaft is connected to the guide rod;
   an uppermost rotating shaft is connected to the guide rod by a fixed sleeve sheathed on the guide rod, the top portion of the upper pressing block is extended out of the fixed sleeve; and a resisting portion is arranged on the fixed sleeve circumferentially, to abut against the sliding sleeve when the folding cart is in an unfolded state.

8. The folding cart of claim 7, wherein a through hole is formed in the middle portion of the upper pressing block, and a front portion of the uppermost rotating shaft is connected to the guide rod after passing through the through hole.

9. The folding cart of claim 1, wherein the folding cart further comprises a locking lever connecting the left frame with the right frame after the folding cart is folded;
one end of the locking lever is connected to one of the frames in a rotary manner and the other end of the locking lever has a bayonet facing downward; and
the other frame has a clamping portion configured for being clamped with the bayonet.

10. The folding cart of claim 1, wherein a U-shaped connecting base having a down-facing opening is arranged on a bottom of each frame;
two first connecting arms are oppositely formed on the U-shaped connecting base;
a roller is disposed between the two first connecting arms on each frame and connects the two first connecting arms by connecting shafts passing through the roller;
a second connecting arm is formed on an outer side of at least one roller to tightly clamp the roller between the two first connecting arms;
a middle portion of the second connecting arm is connected to the connecting shaft in a rotary manner; and
an operating end is formed at each of two ends of the second connecting arm.

* * * * *